United States Patent
Dubroca et al.

(10) Patent No.: US 9,285,590 B2
(45) Date of Patent: Mar. 15, 2016

(54) OPTICAL GUIDANCE DEVICE AND METHOD OF MANUFACTURING SUCH A DEVICE

(75) Inventors: Guilhem Dubroca, Rennes (FR); Pascal Benoit, Rennes (FR); Xavier Hugel, Rennes (FR)

(73) Assignee: OPTINVENT, Rennes (FR)

( * ) Notice: Subject to any disclaimer, the term of this patent is extended or adjusted under 35 U.S.C. 154(b) by 0 days.

(21) Appl. No.: 14/009,866

(22) PCT Filed: Mar. 19, 2012

(86) PCT No.: PCT/EP2012/054832
§ 371 (c)(1),
(2), (4) Date: Dec. 6, 2013

(87) PCT Pub. No.: WO2012/136470
PCT Pub. Date: Oct. 11, 2012

(65) Prior Publication Data
US 2014/0092482 A1    Apr. 3, 2014

(30) Foreign Application Priority Data
Apr. 5, 2011   (FR) .................................. 11 52914

(51) Int. Cl.
*G02B 27/14*   (2006.01)
*G02B 27/01*   (2006.01)
*F21V 8/00*   (2006.01)
*G02B 17/00*   (2006.01)

(52) U.S. Cl.
CPC .......... *G02B 27/0172* (2013.01); *G02B 6/0036* (2013.01); *G02B 17/008* (2013.01); *G02B 27/0101* (2013.01); *G02B 6/0055* (2013.01); *G02B 6/0065* (2013.01); *G02B 2027/0194* (2013.01)

(58) Field of Classification Search
CPC ........... G02B 27/0018; G02B 27/0081; G02B 27/0103; G02B 27/0172; G02B 6/0018; G02B 6/002; G02B 6/0028; G02B 2027/0178; G03H 1/0408; Y10S 385/901
USPC .................................... 359/13, 629–633, 636
See application file for complete search history.

(56) References Cited

U.S. PATENT DOCUMENTS

| 5,341,230 A | 8/1994 | Smith |
| 6,092,904 A | 7/2000 | Tai et al. |
| 2003/0165017 A1 | 9/2003 | Amitai et al. |

FOREIGN PATENT DOCUMENTS

FR    2925172 A1    6/2009

*Primary Examiner* — Mahidere Sahle
(74) *Attorney, Agent, or Firm* — Bachman & LaPointe, P.C.

(57) ABSTRACT

An optical guidance device for optical guidance of a light beam has a first part, in a transparent material, adapted for propagating the light beam by successive reflections. This first part comprises an extraction section comprising at least one microstructure comprising a plane surface adapted to enable the rays of the light beam striking the plane surface to emerge from the guidance device. The device also comprises a second part, in a material substantially identical to that of the first part, comprising a section comprising at least one microstructure with a shape complementary to that or those of the extraction section. The device also has a layer of adhesive assembling the first and second parts in such a way that any microstructure of the extraction section is separated from its complementary microstructure by a transparent medium of substantially constant thickness.

9 Claims, 4 Drawing Sheets

OPTICAL GUIDANCE DEVICE AND METHOD OF MANUFACTURING SUCH A DEVICE

BACKGROUND

The present invention concerns the field of optical guides or optical guidance devices, and more particularly guides for transporting an image without deformation. These guides may in particular be used for building ocular-vision optical systems, more commonly referred to as informative spectacles.

An optical guide generally comprises an injection section by means of which the light beam transporting an image is introduced. The light beam transporting the image comes from a source that may be a matrix of pixels of the LCD (Liquid Cristal Display) type illuminated by a light source or a source of the OLED (Organic Light-Emitting Diode) type. The light beam next passes through an optical system for obtaining a collimated beam, meaning the rays of which are substantially parallel. It is also said that the image is thus carried to infinity. The collimated beam is then introduced into the injection section of the optical guide.

The optical guide enables the light beam to propagate by total internal reflection, optionally by means of a specific treatment of the walls of the optical guide. The light beam thus propagates as far as an extraction section enabling it to emerge from the optical guide. The extraction section may consist of a reflector terminating the optical guide in an inclined plane.

The patent FR 2 925 172 B1 describes an optical guide provided with an extraction section consisting of reflective microstructures formed on the surface of the optical guide. These microstructures consist of prisms having an angle enabling the light beam to emerge from the optical guide. The microstructures are spaced apart by interstitial spaces formed in the extension of the surface of the optical guide. These interstitial spaces, meaning not covered with microstructures and fitting between them, are transparent and thus allows obtaining see-through effect. This enables seeing the image transported by the light beam, as well the scenes beyond the optical guide. These interstitial spaces however imply a phenomenon equivalent to a diffraction through a slot, which causes interference on the vision of the surrounding scenes through the optical guide.

It is desirable to overcome these various drawbacks of the prior art.

It is in particular desirable to provide a solution that enables a user of the optical guide to see an image, injected into the guide, so as to be superimposed on the scene taking place beyond the guide, and this while limiting the interference perceived both on the injected image and on the vision through the optical guide.

It is in particular desirable to provide a solution that overcomes the phenomenon equivalent to a diffraction through a slot inherent in the solutions of the prior art.

It is in particular desirable to provide a solution that is simple, reliable and inexpensive to manufacture.

SUMMARY OF THE INVENTION

The invention concerns an optical guidance device for optical guidance of a light beam transporting an image, said optical guidance device comprising a first part, made from a transparent material, adapted to propagate the light beam by successive reflections. Said first part is such that it comprises an extraction section comprising at least one microstructure, situated on the surface of said first part and comprising a flat surface adapted to enable the rays (3.5) of the light beam striking said flat surface to exit the guidance device. Said optical guidance device is such that it further comprises: a second part, made from a material substantially identical to that of said first part, comprising a section, referred to as complementary section, comprising on the surface at least one microstructure with a form complementary to that or those of the extraction section; and a layer of adhesive extending over a part of the surfaces of said first and second parts assembling them so that any microstructure of said extraction section is separated from its complementary microstructure by a transparent medium of substantially constant thickness.

Thus, by implementing this second part provided with microstructures with a form complementary to those of said extraction section, and by ensuring a separation between each microstructure and its complementary structure by means of a transparent medium with a substantially constant thickness, the phenomenon of diffraction of the prior art for the see-through is limited. The adoption of a complementary form for the second part also allows limiting artefacts and stray images. Plates with parallel faces are in fact formed, which ensures that the rays passing through the separation between the two parts are not diverted. In this way a good image quality is ensured both for the image coming from the see-through effect and for the image transported by the light beam. In addition, such an optical guidance device can be manufactured in a reliable, simple and inexpensive fashion. This is because the first and second parts can be obtained by moulding, in separate moulds, and then assembled by adhesive bonding.

According to a particular embodiment, said layer of adhesive extends over a part of the surface of said first part other than the one adapted to propagate the light beam by successive reflections.

Thus, there is an absence of adhesive between the first and second parts in the area where the light beam propagates from the previously mentioned injection section and the extraction section. In this way, the addition of adhesive does not, from the point of view of the propagation of the light beam, involve an increase in the thickness of the optical guidance device, which would have the effect of creating light holes when the light beam is reflected.

According to a particular embodiment, the layer of adhesive extends over a surface of said first part other than the one comprising the extraction section.

According to a particular embodiment, said adhesive is of the microball type.

Thus, the microballs interposed between the surfaces of the first and second parts facilitate the provision of the substantially constant thickness of the transparent medium between each microstructure and its complementary structure.

According to a particular embodiment, the layer of adhesive constitutes said transparent medium between each microstructure of said extraction section and its complementary microstructure.

According to a particular embodiment, each microstructure of said extraction section is composed of a prism projecting on the surface of said first part. According to another particular embodiment, each microstructure of said extraction section is composed of a prism in the form of a hollow on the surface of said first part.

According to a particular embodiment, said optical guidance device comprises a layer made from partially reflective material extending over each microstructure of said extraction section.

Thus, according to the features of the guidance device, it is possible to apply a homogeneous layer of partially reflective material on the microstructures of the extraction section. The same treatment being applied to the whole extraction section, this simplifies and reduces the manufacturing cost of the guidance device in comparison with the prior art. The external scene, obtained by see-through effect, thus has a uniform attenuation applied thereto, whereas a deposition occupying only discontinuous parts of the extraction area may modify perception thereof.

The invention also concerns an ocular-vision optical system, characterised in that it comprises an optical guidance device according to any one of the preceding embodiments.

The invention also concerns a method for manufacturing an optical guidance device according to any one of the preceding embodiments, the method being such that it comprises the following steps: a step of obtaining at least one first microstructure on the surface of a first part of said guidance device; a step of obtaining at least one second microstructure, with a form complementary to the first microstructure or structures, on the surface of a second part of said guidance device; a step of depositing a layer of partially reflective material on the microstructure or microstructures of said first part; a step of bonding the first and second parts together, so that any microstructure of said extraction section is separated from its complementary microstructure by a transparent medium with a substantially constant thickness.

Thus, the manufacturing of the guidance device is simplified, the result thereof is reliable and the costs are reduced compared with the prior art. The first and second parts may be obtained during separate moulding operations, possibly performed in parallel.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

The present invention consists of an optical guidance device, or optical guide, for transporting an image without deformation. The invention will be described with reference to a particular embodiment intended to be used in an ocular-vision optical system. The invention may however by used in any other field using such optical guides, such as screens integrated in a car windscreen or in the cockpit of an aircraft.

Figure 1:
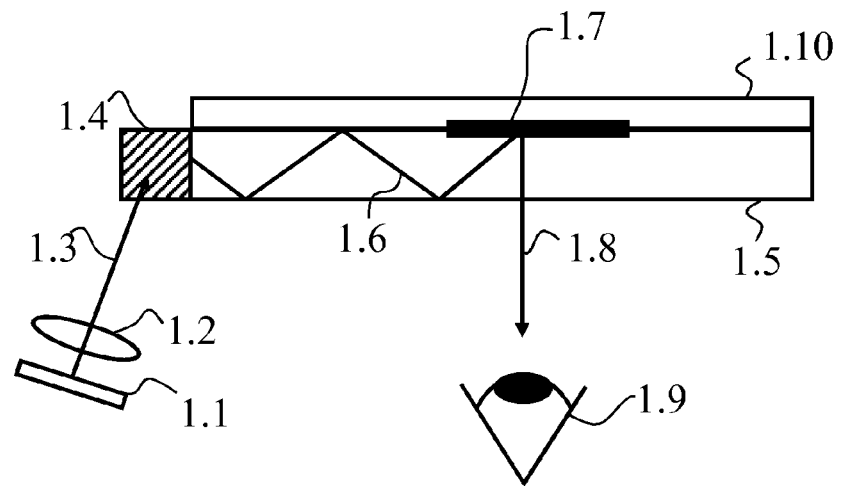
FIG. 1 schematically illustrates an optical guidance device according to one embodiment of the present invention.

FIG. 1 schematically illustrates such an optical guidance device.

The guidance device comprises two main parts: a first part 1.5 and a second part 1.10.

The first part 1.5 propagates, by successive reflections, a light beam 1.6 transporting an image over a predefined distance. The first part 1.5 comprises an extraction section for making the light beam emerge from the optical guidance device once it has reached this predefined distance.

The second part 1.10 consists of a material substantially identical to that of said first part. It is superimposed on the first part 1.5, in a way that is detailed hereafter, and allows obtaining the see-through effect, without any interference phenomenon of of the type diffraction of a slot.

A light source 1.1 generates the light beam transporting the image intended to pass through the optical guide. This source may consist of a matrix of LCD pixels having backlighting or a matrix of OLED pixels. Any luminous image source may be used here.

The light beam is then collimated by an optical system 1.2. The various pixels of the image are therefore projected by a beam of parallel light rays 1.3 emerging from the optical system 1.2, and the vision field is defined by the focal length of the objective and by the half-diagonal of the image to be transported. The collimated light beam 1.3 is then projected into an injection section 1.4. This injection section is detailed hereafter in relation to FIG. 2.

The light beam is then transported in the first part 1.5 until it reaches the extraction section, from which the light beam is projected out of the optical guidance device.

The first part 1.5 consists of a material transparent to light. If the index of the material is greater than those of the media that surround it, total internal reflections naturally occur provided that the angle of incidence of the rays of the beam is sufficiently small with respect to the surface on which the light beam strikes.

The extraction section is situated on one of the faces of the first part 1.5. It returns the light beam towards the other face of the first part 1.5 at a substantially perpendicular angle, which enables the light beam to emerge from the guidance device. The light beam 1.8 is thus projected out of the guidance device towards a sensor 1.9, which may be the eye of a user in the case of an ocular-vision optical system.

The extraction section is situated in an area 1.7 of the guidance device, in which the first part 1.5 comprises at least one microstructure, situated on the surface and comprising a flat surface adapted to enable the rays of the light beam that strike said flat surface to emerge from the guidance device. In this area 1.7, the second part 1.10 comprises at least one microstructure with a shape complementary to that or those of the first part 1.5. The microstructures that are complementary to each other are thus placed opposite each other.

The first 1.5 and second 1.10 parts are assembled so that every microstructure in the extraction section is separated from its complementary microstructure by a transparent medium with a substantially constant thickness. The thickness is chosen so as to involve a limited modification to the view of the external scene. The microstructures and their complementary structures being substantially parallel because of the substantially constant thickness of the transparent medium, the view of the external scene is not substantially modified, since the rays undergo only a small translation.

Figure 8:
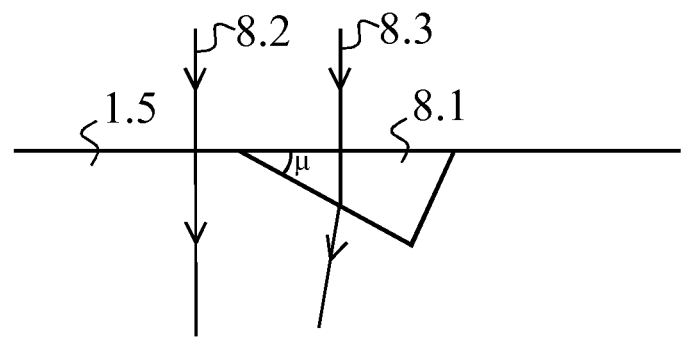
FIG. 8 schematically illustrates the effects of a microstructure of the first part on the rays issuing from an external scene, when the first part is filled with a filling material and when the second part is not present.

So as to attempt to respond to the stated problem, it has been noted that one solution might have consisted of filling in the hollows of the microstructures of the extraction section, whether these microstructures be prisms in the form of a projection or in a hollow, with a filling material 8.1, as illustrated schematically in FIG. 8. However, if this filling material 8.1 is different from that of the first part 1.5, this creates a relatively great refraction of the see-through rays. This refraction must be considered with respect to the size of a pixel. The typical size of a video pixel is around 0.03°. If the two materials are different, they would have two different indices, $n_1$ for the filling material and $n_2$ for the material of the first part 1.5. The deviation of a ray arriving perpendicular to the surface of the first part 1.5 can be evaluated, the microstructure being a prism of angle $\mu$. This situation is shown in FIG. 8, in which a ray 8.2 arrives on the external scene perpendicular to the surface of the first part 1.5 without passing through the filling material 1.8, and in which a ray 8.3 parallel to the ray 8.1 passes through the filling material 8.1. $\Delta N=(n_2-n_1)/n_1$ is posed. It happens that the refracted angle $\mu'$ is such that:

$$\mu' = a\sin\left(\frac{n_1}{n_2}\sin\mu\right) = a\sin\left(\frac{1}{1+\Delta N}\sin\mu\right) \simeq \mu - \Delta N \frac{\sin\mu}{\cos\mu}$$

and the deviation:

$$\Delta\mu = \mu' - \mu = -\Delta N \tan\mu$$

If $\mu=25.5°$ is taken and the indices $n_1$ and $n_2$ approximately equal to 1.5, the deviation of 0.03° is reached for a difference in index of 8e-4.

Figure 9:
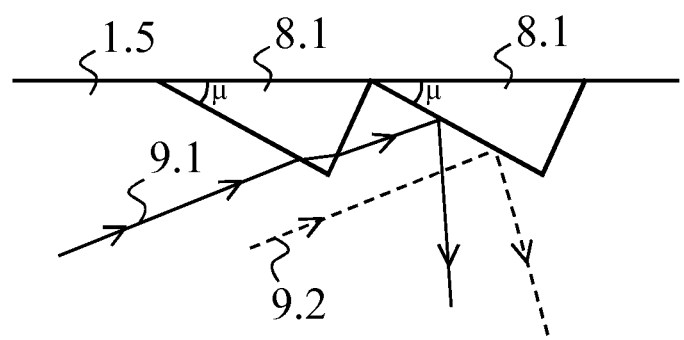
FIG. 9 schematically illustrates the effects of a microstructure of the first part on rays issuing from an image injected via the injection section, when the first part is filled with a filling material and when the second part is not present.

In addition, the rays coming from the light beam 1.6 that continue their propagation through the microstructures of the extraction section may imply stray images. They undergo a refraction each time they pass through the interface between the two materials. However, there almost always exist a large number of rays that may enter the filling material and then re-enter the material of the first part 1.5, undergoing two refractions that are not compensated for, substantially reducing the image quality. Such a situation is presented in FIG. 9, where two microstructures in the form of a hollow prism filled with the filling material 8.1 are shown. The offset existing between a ray 9.1 undergoing the two refractions that are not compensated for and the divergence that this causes with respect to a theoretical ray 9.2 are shown therein.

And, if this given material is substantially identical to that of the first part 1.5, a manufacturing problem is posed. This is because performing moulding with this given material on the first part 1.5 could cause a fusion of the surface of the first part 1.5, which would impair its properties of reflection of the light rays. The arrangements according to the present invention overcome these drawbacks.

Figure 3:
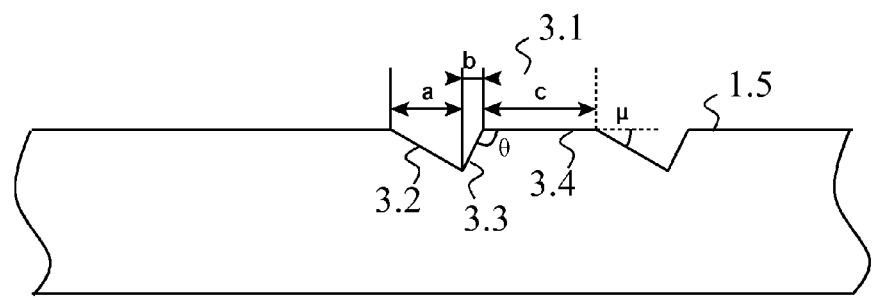
FIG. 3 schematically illustrates a portion of a first part of the optical guidance device of FIG. 1.
Figure 4:
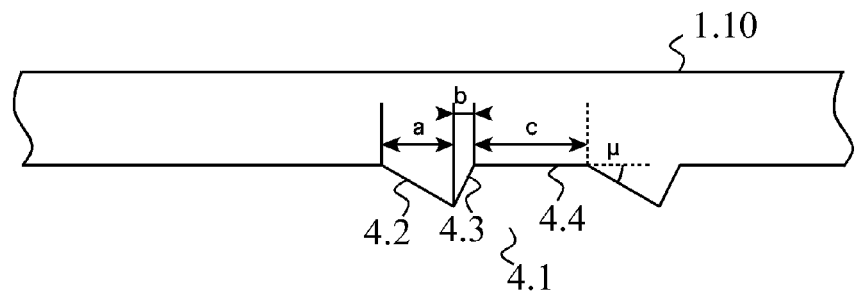
FIG. 4 schematically illustrates a portion of a second part of the optical guidance device of FIG. 1.

Embodiments of the first 1.5 and second 1.10 parts are respectively described hereafter in relation to FIGS. 3 and 4.

Figure 2:
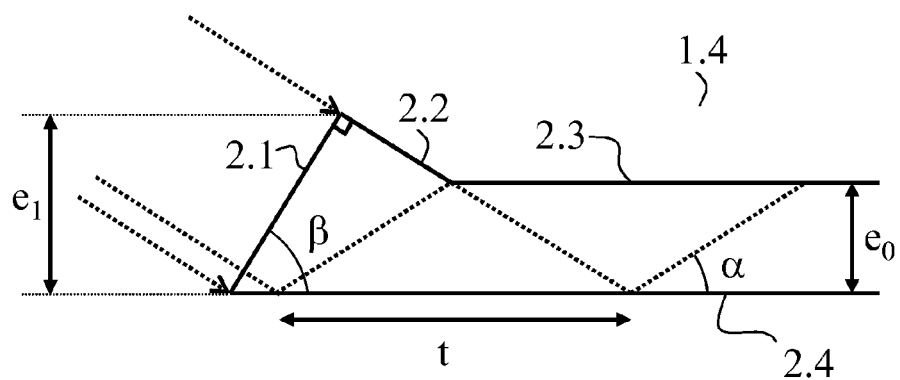
FIG. 2 schematically illustrates an injection section of the optical guidance device of FIG. 1.

FIG. 2 schematically illustrates the injection section 1.4. Other embodiments of the injection section 1.4 are possible without departing from the scope of the invention provided that the light beam enters the guide without undergoing any degradation liable to degrade the image.

The injection section 1.4 is composed of a flat entry face 2.1 forming an angle $\beta$, different from 90°, with the plane of the parallel surfaces of the first part 1.5. The collimated light beam 1.3 enters perpendicular to the entry face 2.1. A facet 2.2 connects the entry face 2.1 and a first face 2.3 of the first part 1.5. The facet 2.2 is perpendicular to the entry face 2.1. The facet 2.2 is preferentially absorbent in order to prevent stray images. The collimated light beam 1.3 passes through the entry face 2.1 and strikes the second face 2.4 of the first part 1.5. The angle $\beta$ is calculated so that the angle of incidence $\alpha$ of the rays of the collimated light beam 1.3 with the second face 2.4 of the first part 1.5 affords total reflection of the rays. A ray thus injected into the first part 1.5 is trapped and propagates along the first part 1.5 through reflections on its faces. The faces of the first part 1.5 being parallel, the ray preserves the angle of incidence $\alpha$ at each bounce against the faces of the first part 1.5.

The light beam 1.6 propagates by internal reflections on the faces of the first part 1.5, which forms successive spots on the faces of the first part 1.5. These spots may either overlap or be just up against each other, or there may be gaps without light between them. It is difficult to ensure that the extraction section does not fall straddling two spots, if it is wished to preserve reasonable dimensions, as well as a field of an advantageous size. If there are holes between the spots, the image seen by the observer is not uniform, and it may even be that the portions of the image transported disappear through absence of light entering the pupil of the eye of the observer. The configurations where there are such holes are therefore to be avoided.

If the thickness of the first part 1.5 is denoted $e_0$ where the light beam 1.6 propagates, the distance s between two bounces of a ray is:

$$s=e_0.\tan(\beta).$$

The entering collimated light beam 1.3 is spread over a distance t such that:

$$t=2e_0/\sin(2\beta).$$

So that these light holes do not exist, it is necessary for 2s<t. This condition is satisfied for $\beta>45°$. To assist with the internal total reflections, it is desirable for the condition $\beta>45°$ to be satisfied.

To minimise these light holes, the width of the entry face 2.1 of the injection section 1.4 may be increased. If the distance between the top of the entry face 2.1 and the opposite face of the first part 1.5, for an incident ray normal to the entry face 2.1, is denoted $e_1$, the following condition must be satisfied in order not to have any light holes:

$$e_0.\tan(\beta)=e_1/\sin(\beta); \text{ that is to say: } e_1=2e_0\sin^2(\beta).$$

It has thus to be noted that the presence or absence of these light holes is in particular related to the values of $e_0$ and $\beta$. Changing one of these parameters requires changing the other so as to avoid these light holes.

FIG. 3 schematically illustrates a portion of the first part 1.5 of the optical guidance device of FIG. 1. FIG. 3 sets out more particularly to illustrate the microstructures 3.1 of the extraction section.

The microstructures 3.1 are arranged, or formed, on the surface of the first part 1.5, the rays reflected by these microstructures emerging through the opposite face. The microstructures 3.1 are for example prisms with a flat face the active angle of which is constant along each microstructure. The size and arrangement of these microstructures 3.1 depend on the application using the optical guidance device. In the case of an ocular-vision optical system, the size of the microstructures 3.1 will preferentially be small compared with the size of the pupil of the eye, for example around a few tens of μm. In this way, the projected image does not vary according to the position and movements of the eye. Because of their size and short distance from the eye, the microstructures 3.1 are invisible to the naked eye.

In addition, as will be seen subsequently, the microstructures 3.1 being covered with a partially reflective material, the optical guidance device remains sufficiently transparent to allow see-through.

FIG. 3 shows microstructures 3.1, each being composed of a prism in the form of a hollow on the surface of the first part 1.5. In a variant embodiment, each microstructure is composed of a prism forming a projection on the surface of the first part 1.5. A prism is said to be projecting when the point on the prism furthest away from the plane defined by the face on which they are constructed is such that the thickness is at this point greater than the thickness of the first part 1.5 where there are no prisms. In the case where this thickness is less, the prism is said to be hollow.

The width of each microstructure must be greater than the wavelength of the visible light and therefore at least 10 µm. For the application already mentioned of the ocular-vision optical system, its width must remain small compared with the thickness of the first part 1.5 and compared with the size of the pupil of the eye of the user. For example, a width of around 200 µm, or even up to 750 µm, may be used. The reader should understand that, in different applications, other sizes of microstructures 3.1 may be envisaged without departing from the scope of the invention.

A single microstructure having a length of at least 10 µm enables bringing an image out of the optical guidance device. To increase the quality of the projected image, and so as to offer a wide field of vision, a set of several microstructures 3.1 may be implemented.

In the example embodiment of the invention according to FIGS. 1 to 4, the first part 1.5 comprises two parallel flat faces, which means that all the rays arrive substantially with the same angle of incidence on the microstructures 3.1. The microstructures 3.1 are then provided with flat surfaces, for projecting the image out of the optical guidance device, all having the same angle. In variant embodiments, for example if the first part 1.5 is curved, the angles of the flat surfaces of the microstructures 3.1 may vary from one microstructure to another.

The hollow prisms shown in FIG. 3 are formed from a first face 3.2, onto which rays of the light beam 1.6 are diverted in order to be projected out of the optical guidance device, and a second connecting face 3.3, which allows returning to a thickness equal to that of the first part 1.5 where there are no prisms.

The acute angle formed by the first face 3.2 of a prism and the parallel to the faces of the first part 1.5 is denoted µ. The projection, on the surface of the first part 1.5, of the first face 3.2 of the prism has a length denoted α, and that of the second face 3.3 of the prism has a length b. The distance between two microstructures is denoted c. In a particular embodiment, the distance c is zero.

Fuller details on the form of the microstructures 3.1 are supplied in the patent FR 2 925 172 B1 and are applicable in the present context.

FIG. 4 schematically illustrates a portion of the second part 1.10 of the optical guidance device of FIG. 1. FIG. 4 sets out more particularly to illustrate the microstructures 4.1 complementary to the microstructures 3.1 of the extraction section.

The microstructures 4.1 are present in a section of the second part 1.10 intended to be placed so as to correspond to the extraction section of the first part 1.5. This section of the second part 1.10 is referred to as the complementary section.

The microstructures 4.1 are disposed on the surface of the second part 1.10. The microstructures 4.1 are complementary in shape to the microstructures of the extraction section of the first part 1.5. A microstructure 4.1 corresponds to each microstructure 3.1.

FIG. 4 shows microstructures 4.1, each being composed of a prism projecting on the surface of the second part 1.10. They are complementary to the microstructures 3.1 shown in FIG. 3. In the case where the microstructures 3.1 are prisms projecting on the surface of the first part 1.5, the microstructures 4.1 are then prisms, with the same dimensions, formed hollow on the surface of the second part 1.10.

The microstructures 4.1 are therefore complementary in shape to the microstructures 3.1. The projecting prisms shown in FIG. 4 are formed by a first face 4.2, forming an acute angle equal to µ with the parallel to the faces of the second part 1.10, and a second connecting face 4.3, which makes it possible to return to a thickness equal to that of the second part 1.10 where there are no prisms.

It should be noted that, in the representation in FIG. 4, the faces of the second part 1.10 of the optical guidance device are parallel to the faces of the first part 1.5 of the optical guidance device, as shown in FIG. 3.

Figure 5:
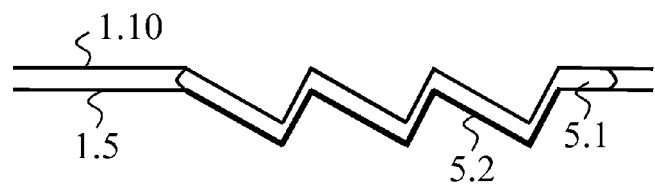
FIG. 5 schematically illustrates a first particular embodiment of an assembly of the first and second parts of the optical guidance device of FIG. 1.

FIG. 5 schematically illustrates a first particular embodiment of an assembly of the first 1.5 and second 1.10 parts of the optical guidance device of FIG. 1.

This first embodiment allows an assembly of the first 1.5 and second 1.10 parts so that any microstructure of the extraction section of the first part 1.5 is separated from its complementary microstructure of the second part 1.10 by a transparent medium of substantially constant thickness.

As can be seen in FIG. 5, the first 1.5 and second 1.10 parts are assembled so that their microstructures are placed opposite in a complementary fashion, meaning, with reference to FIGS. 3 and 4, so that the projecting prisms of the second part 1.10 fit partially in the hollow prisms of the first part 1.5. The projecting prisms of the second part 1.10 fit only partially in the hollow prisms of the first part 1.5 because of the presence of the transparent medium between the microstructures and their complements.

In the first embodiment in FIG. 5, the first 1.5 and second 1.10 parts are assembled by means of a layer of adhesive 5.1 between the extraction section and the complementary section. The layer of adhesive 5.1 then constitutes the transparent medium between each microstructure of the extraction section and its complementary microstructure.

In the embodiment in FIG. 5, on the external surface of the microstructures of the first part 1.5, a layer 5.2 of partially reflective material is deposited. In this way there is a layer 5.2 of partially reflective material that extends between each microstructure of the extraction section and its complementary microstructure. This layer 5.2 of partially reflective material enables the extraction section to make the light beam 1.6 emerge from the guidance device by reflection of rays, and also enables, by transparency, the implementation of the see-through effect. The layer 5.2 of partially transparent material is preferentially equally distributed over the extraction section, so as to obtain a homogeneous see-through effect. It is possible for example to use a thickness of material that provides a reflectivity of around ¼.

So as to facilitate the deposition of this layer of partially reflective material, the microstructures 3.1 have a form such that the connecting face 3.3 forms an obtuse angle θ, as shown in FIG. 3, with the parallel to the faces of the first part 1.5.

So as to limit the refraction effect related to the introduction of the layer of adhesive 5.1, its thickness must be limited. For example a thickness of adhesive of 100 µm creates a parasite with a relative intensity of 1%, and a thickness of adhesive of 25 μm creates a parasite with a relative intensity of 0.5%. The sizing of the relative intensity parasite depends on the application in which the optical guidance device fits.

It should be noted that, as the layer of adhesive 5.1 is disposed between the microstructures of the first 1.5 and second 1.10 parts, it extends over a part of the surface of the first part 1.5 other than that adapted for propagating the light beam 1.6 by successive reflections. This allows preventing light holes being created by the application of the layer of adhesive. This is because, if the adhesive extended above this area where the rays propagate by reflections on the faces of the first part 1.5, the actual thickness of the guide of the light beam 1.6 would be the sum of the thickness of the first part 1.5, the thickness of adhesive and the thickness of the second part 1.10. The index of the adhesive being similar to that of the material of the first 1.5 and second 1.10 parts, the rays can pass through this thickness of adhesive and the total reflection takes place on the external face of the second part 1.10. The sizing of the first part can thus take place, as already explained in relation to FIG. 2, independently of the assembly method. The design is simplified thereby.

The layer of adhesive 5.1 can also be disposed on another part of the first part 1.5, in addition to the adhesive present between the microstructures and their complements.

Figure 6:
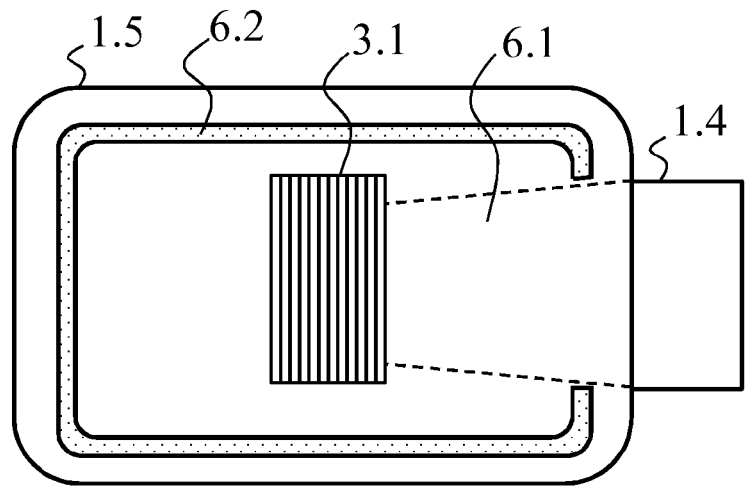
FIG. 6 schematically illustrates a second particular embodiment of an assembly of the first and second parts of the optical guidance device of FIG. 1.

FIG. 6 schematically illustrates a second particular embodiment of the assembly of the first 1.5 and second 1.10 parts of the optical guidance device of FIG. 1.

This second embodiment enables the first 1.5 and second 1.10 parts to be assembled so that any microstructure of the extraction section of the first part 1.5 is separated from its complementary microstructure of the second part 1.10 by a transparent medium of substantially constant thickness.

In this second embodiment, the transparent medium separating each microstructure from its complement is in this case a gas, for example air.

As for the first embodiment in FIG. 5, the first 1.5 and second 1.10 parts are assembled so that their microstructures are placed facing in a complementary fashion, meaning, with reference to FIGS. 3 and 4, so that the projecting prisms of the second part 1.10 fit partially in the hollow prisms of the first part 1.5.

As for the first embodiment of FIG. 5, a layer of adhesive 6.2 allows assembling the first 1.5 and second parts 1.10 of the guidance device. The layer of adhesive 6.2 extends here over a surface of said first part other than the one comprising the extraction section. The layer of adhesive 6.2 may extend so as to partially surround the extraction section.

The constraints on the thickness of the layer of adhesive 6.2 are substantially of the same order of magnitude as that which was expressed for the first embodiment in FIG. 5.

It should be noted that, on the diagram in FIG. 6, the layer of adhesive extends over a part of the surface of the first part 1.5 other than the part 6.1 adapted for propagating the light beam 1.6 by successive reflections, this being delimited by broken lines in FIG. 6.

In a particular embodiment, the adhesive used is a microball adhesive. The microballs then afford greater control of the interstice between the first 1.5 and second 1.10 parts of the guidance device. The assembly method is simplified thereby.

In the same way as in the embodiment in FIG. 5, a layer 5.2 of partially reflective material can be deposited on the external surface of the microstructures of the first part 1.5.

Figure 7:
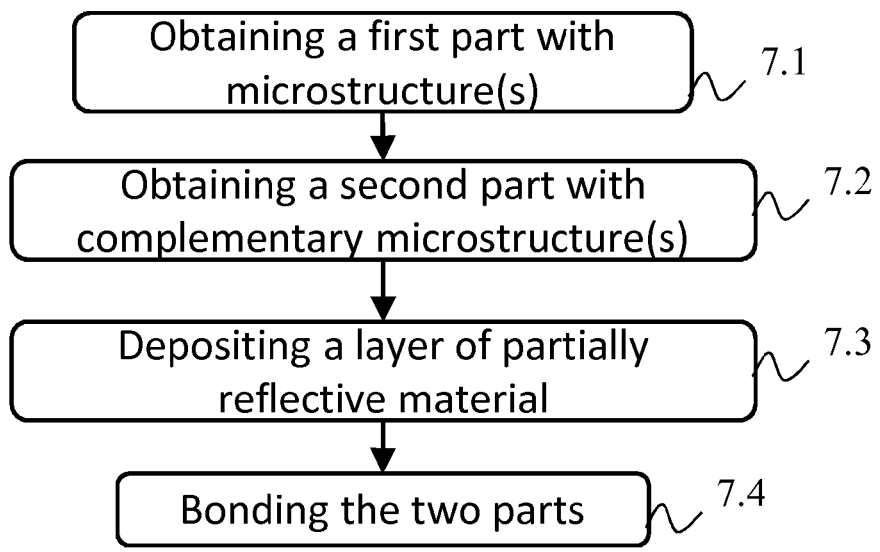
FIG. 7 schematically illustrates the steps of a method for manufacturing the optical guidance device of FIG. 1.

FIG. 7 schematically illustrates the steps of a method of manufacturing the optical guidance device in FIG. 1.

In a step 7.1, the first part 1.5 is obtained, comprising at least one microstructure, situated on the surface of one of the two faces of said first part and comprising a flat surface adapted to enable rays of the light beam striking this flat surface to emerge from the guidance device.

In a step 7.2, the second part 1.10 is obtained, comprising on the surface at least one microstructure with a form complementary to that or those of the first part 1.5.

It should be noted that, as the microstructures of the first 1.5 and the second 1.10 parts of the optical guidance device are complementary to each other, the steps 7.1 and 7.2 may be reversed. They may also be performed in parallel.

The steps 7.1 and 7.2 are preferentially performed by moulding.

In a step 7.3, a layer of partially reflective material is deposited on the microstructure or microstructures of the first part 1.5. Preferentially, the layer of material is deposited so as to be equally distributed over the microstructure or microstructures of the first part 1.5. Thus the layer of partially reflective material is deposited, with reference to FIG. 3, on both the faces 3.2 and 3.3 of each microstructure.

In a following step 7.4, the first and second parts are bonded together, so that any microstructure of the extraction section is separated from its complementary microstructure by a transparent medium of substantially constant thickness. This bonding operation may be performed so as to obtain an assembly as previously described in relation to FIGS. 5 and 6.

The layer of adhesive can be deposited, with a view to assembly, either on the first part 1.5 or on the second part 1.10 of the guidance device.

The invention claimed is:

1. An optical guidance device for optical guidance of a light beam transporting an image, said optical guidance device comprising:
    a first part, made from a transparent material, comprising an extraction section comprising at least one microstructure, situated on a surface of said first part; and
    a second part, made from a material substantially identical to that of said first part, comprising a section, comprising on a surface thereof at least one microstructure with a form complementary to that or those of said extraction section;
    wherein the optical guidance device is such that said first part propagates the light beam by successive total internal reflections inside said first part, and wherein each said at least one microstructure comprises a flat surface enabling rays of the light beam propagated by successive reflections in said first part and striking said flat surface to emerge from the optical guidance device; and
    wherein said optical guidance device further comprises
    a layer of adhesive extending over a part of the surfaces of said first and second parts assembling them so that every microstructure of said extraction section is separated from its complementary microstructure by a transparent medium of substantially constant thickness.

2. The optical guidance device according to claim 1, wherein said layer of adhesive extends over a part of the surface of said first part other than the one propagating the light beam by successive reflections.

3. The optical guidance device according to claim 2, wherein the layer of adhesive extends over a surface of said first part other that the one comprising the extraction section.

4. The optical guidance device according to claim 3, wherein said adhesive is of the microball type.

5. The optical guidance device according to claim 2, wherein the layer of adhesive constitutes said transparent medium between each microstructure of said extraction section and its complementary microstructure.

6. The optical guidance device according to claim 1, wherein each microstructure of said extraction section is composed of a prism forming a projection on the surface of said first part.

7. The optical guidance device according to claim 1, wherein each microstructure of said extraction section is composed of a prism in the form of hollows on the surface of said first part.

8. The optical guidance device according to claim 1, wherein said optical guidance device comprises a layer of partially reflective material extending over each microstructure of said extraction section.

9. An ocular-vision optical system comprising an optical guidance device for optical guidance of a light beam transporting an image, said optical guidance device comprising:
   a first part, made from a transparent material, comprising an extraction section comprising at least one microstructure, situated on a surface of said first part;
   a second part, made from a material substantially identical to that of said first part, comprising a section, comprising on a surface thereof at least one microstructure with a form complementary to that or those of said extraction section;
   wherein the optical guidance device is such that said first part propagates the light beam by successive total internal reflections inside said first part and wherein each microstructure comprises a flat surface enabling rays of the light beam propagated by successive reflections in said first part and striking said flat surface to emerge from the optical guidance device; and
   wherein said optical guidance device further comprises:
   a layer of adhesive extending over a part of the surfaces of said first and second parts assembling them so that every microstructure of said extraction section is separated from its complementary microstructure by a transparent medium of substantially constant thickness.

* * * * *